1,932,200

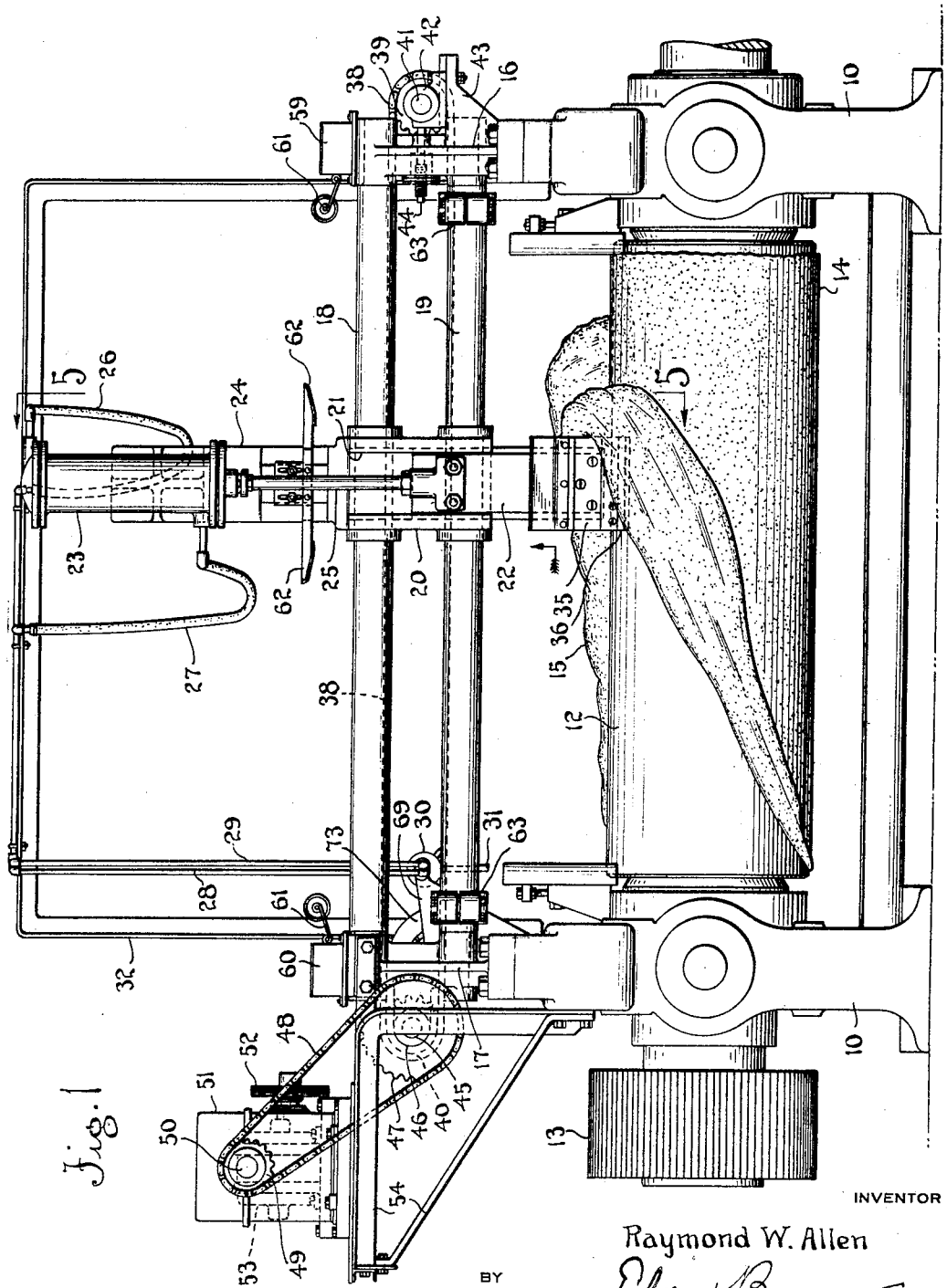

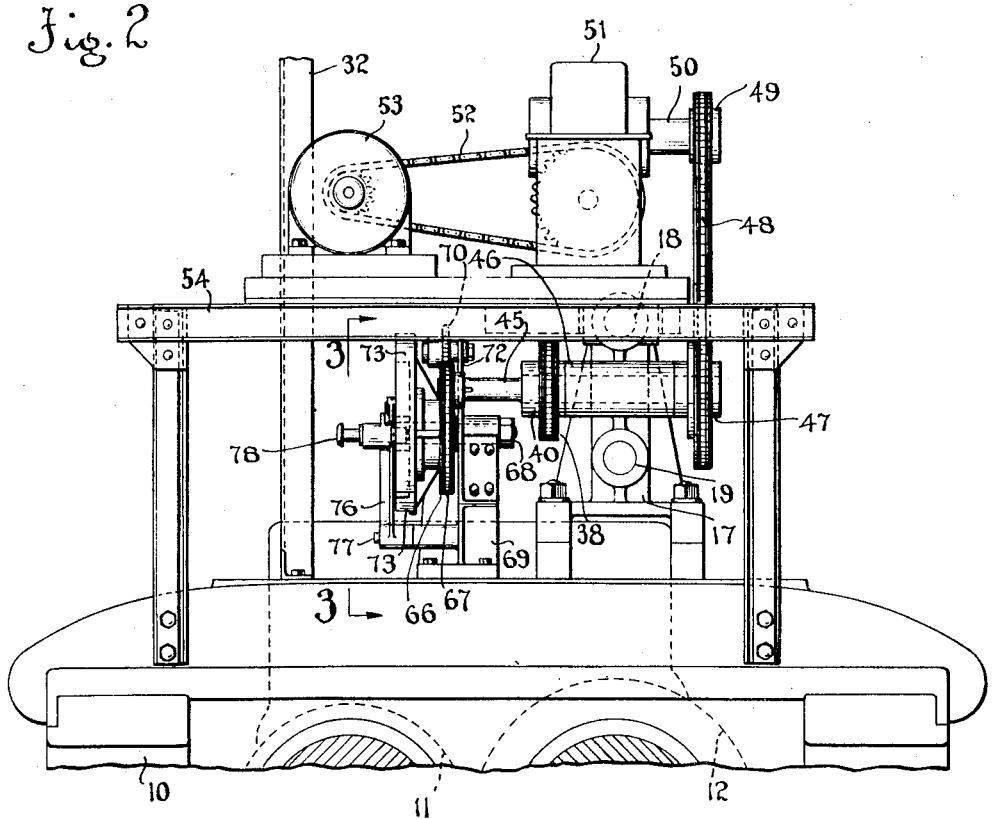
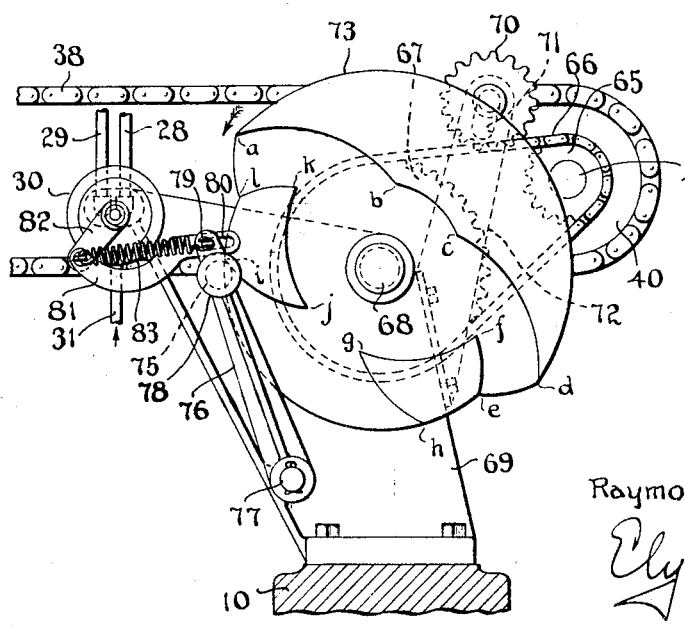

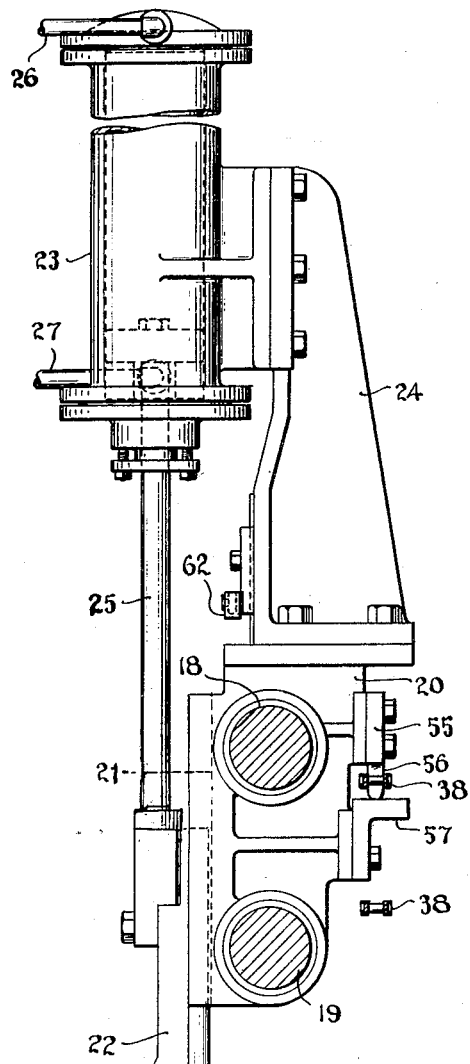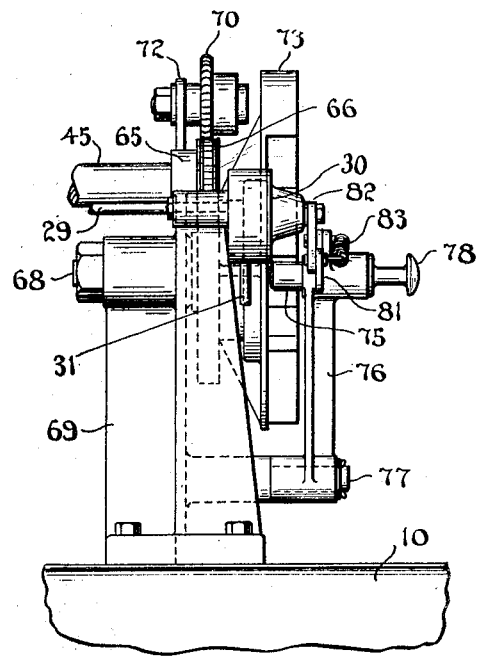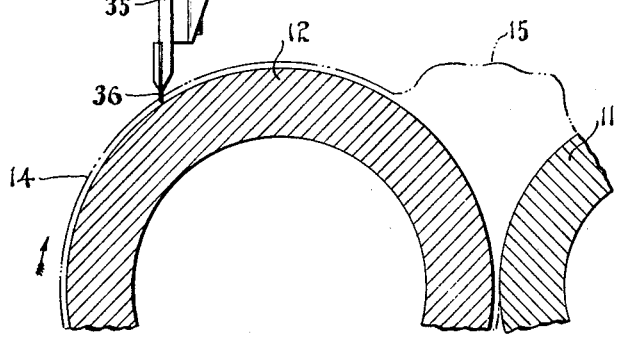

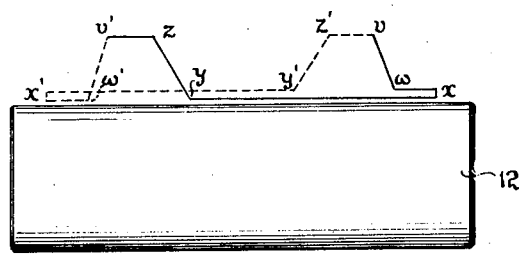
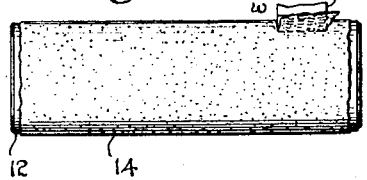
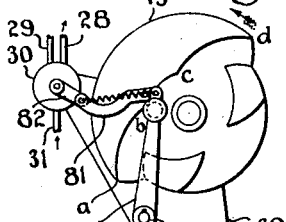
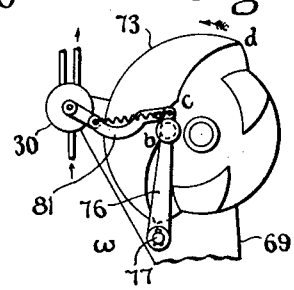
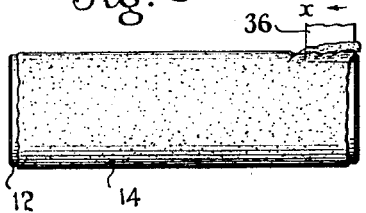
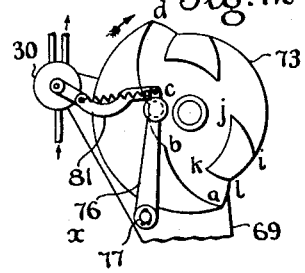
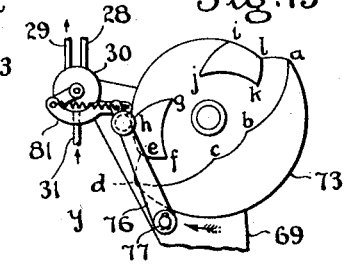
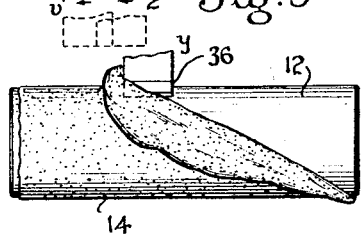
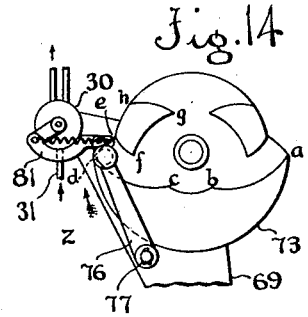
INVENTOR
Raymond W. Allen Patented Oct. 24, 1933

UNITED STATES PATENT OFFICE 1,932,200

APPARATUS FOR TREATING PLASTIC MATERIAL AND TIMING MECHANISM THEREFOR

Raymond W. Allen, Akron, Ohio, assignor to The Firestone Tire & Rubber Company, Akron, Ohio, a corporation of Ohio Application December 17, 1932
Serial No. 647,765

10 Claims. (Cl. 18—2)

This invention relates to apparatus for treating plastic material, and more especially it relates to rubber-working apparatus, such as mixing mills and warming mills, comprising automatically operating mechanism for stripping the plastic sheet of material from one of the mill rolls and feeding it back into the bite of the rolls, said mechanism being time-controlled by a cam device, whereby a more intimate mixing of the material is effected, or the warming thereof expedited.

Apparatus heretofore provided for the purpose mentioned comprised a scraper adapted to engage the surface of a mill roll at one end thereof, and to move toward the opposite end of said roll for the purpose of scraping and stripping plastic sheet material, such as unvulcanized rubber composition, from said mill roll, said scraper moving away from the roll before reaching the opposite end thereof so that the material scraped therefrom could be drawn back into the bite of the rolls. Because of the tough, coherent nature of unvulcanized rubber, the scraper frequently failed to penetrate the thick sheet thereof on the mill roll until said scraper had moved a substantial distance longitudinally of the mill roll, away from the end thereof, with the result that the rubber was not stripped from the roll in the desired manner. This condition occurred even when the scraper remained stationary on the mill roll while the latter made one or more revolutions.

The chief objects of the invention are to provide, in a rubber-working mill, improved mechanism for stripping the plastic rubber composition from a mill roll and then feeding it back into the bite of the mill rolls and timing means for controlling said mechanism. Another object is to devise mechanical rubber-mixing apparatus which will mix the rubber more thoroughly and uniformly than the manual method. A more specific object is to provide for so moving the work-stripping member relatively of the mill roll that improved operation is achieved. Other objects will be manifest.

The foregoing and other objects are achieved in the present invention which comprises broadly a two-roll mill, a work-scraper adapted to engage the surface of one of the mill rolls, and means for moving the scraper relatively of the mill roll in a determinate course which comprises first moving the scraper into engagement with the mill roll at a point near but spaced from one end of the roll, then moving it to the near end of the roll, then reversing its course and moving it toward the opposite end of the roll, and then removing it from the roll before the opposite end is reached, all of said movements occurring in a plane parallel to the axis of the mill roll. The initial movement of the scraper toward the end of the roll is of sufficient duration and extent to permit the scraper completely to penetrate the thick sheet of plastic material thereon, so that the reverse movement of the scraper progressively scrapes and strips the material from the roll from one end thereof toward the other end, the stripped material arranging itself in folds upon the surface of the rotating roll, and then passing endwise into the bite of the rolls after the scraper is lifted, at the conclusion of the cycle of operation, near the opposite end of the roll. The operation described is continuous, and is repeated, first at one end of the mill roll and then at the other end.

Of the accompanying drawings:

Figure 1 is a front elevation of apparatus embodying the invention, in its preferred form;

Figure 2 is a fragmentary end elevation thereof as viewed from the left of Figure 1;

Figure 3 is a section on the line 3—3 of Figure 2 showing a control cam mechanism for the scraper, in elevation;

Figure 4 is a side elevation of the mechanism shown in Figure 3 as viewed from the left thereof;

Figure 5 is a section on the line 5—5 of Figure 1, showing a roll-scraper device in side elevation;

Figure 6 is a diagrammatic view showing the course of the scraper with relation to a mill roll;

Figure 7 is a detail elevation of a mill roll showing the scraper as it initially engages the same;

Figure 8 is a view similar to Figure 7 showing the scraper at the position where its direction of movement on the mill roll is reversed;

Figure 9 is a view similar to Figures 7 and 8 showing the extreme position of the scraper before it moves out of engagement with the mill roll;

Figures 10 and 11 are elevations of the control cam and associated mechanism in positions corresponding to the positions of the scraper shown in Figure 7;

Figures 12 and 13 are elevations of the control cam mechanism in positions corresponding to the full line positions of the scraper in Figure 8 and Figure 9 respectively; and Figures 14 and 15 are elevations of the control cam mechanism in positions corresponding to the broken line positions of the scraper in Figure 9.

Referring to Figures 1 and 2 of the drawings, there is shown a rubber-working mill comprising end-frames 10, 10 in which are journaled a pair of laterally disposed, horizontal rolls 11, 12, that are geared together as by gears such as that shown at 13, Figure 1, and driven in unison by the usual driving means (not shown). The rolls 11, 12 are adapted to form a sheet 14 of plastic composition from a bank 15 of such composition that is fed into the bite between said rolls, the sheet 14 being shown herein as being formed on the front roll 12.

Mounted upon the top of end frames 10 are respective brackets 16, 17 that carry a pair of guide-bars 18, 19 that are parallel to each other and to roll 12 and are disposed in a vertical plane with the latter. The guide-bars 18, 19 slidably support a carriage 20 that is movable longitudinally thereof, and the front face of said carriage is formed with a vertical dove-tail slideway 21 in which is mounted a slide 22. Vertical movement of the slide 22 is effected by means of a superposed vertically positioned, double-acting, fluid-pressure operated cylinder 23 that is carried by a bracket 24 that is mounted upon the carriage 20, the piston rod 25 of cylinder 23 extending downwardly and having its outer end connected to the upper end of said slide. Fluid pressure is supplied to the upper and lower ends of cylinder 23 through flexible hose or pipes 26, 27 respectively, that constitute extensions of respective rigid pipes 28, 29 that are connected to a control valve 30, the latter being provided with a supply pipe 31 extending to any suitable source of pressure fluid (not shown), and with the usual exhaust port (not shown). A light frame 32 may be provided for supporting the pipes 28, 29. The lower end of slide 22 carries an adjustable holder 35 for a scraper blade 36 that engages the surface of mill roll 12, on the upwardly moving side thereof, when the slide 22 is in lowered position as is most clearly shown in Figure 5.

For moving the carriage 20 longitudinally of the guide-bars 18, 19, whereby the scraper 36 is moved longitudinally of roll 12, there is provided an endless sprocket chain 38 that is trained about a pair of sprockets 39, 40 positioned at opposite ends of the mill. As is most clearly shown in Figure 1, the sprocket 39 is mounted upon an idler shaft 41 that is journaled in a bearing bracket 42, the latter being mounted upon a lateral extension 43 of the bracket 16. An adjusting screw 44 is threaded through bracket 16 and engages bracket 42 for the purpose of tightening or loosening sprocket chain 38. The sprocket 40 is mounted upon a driven shaft 45 that is journaled in a laterally-extending bearing structure 46 formed on the bracket 17. Both ends of shaft 45 extend beyond said bearing structure, and one end thereof carries a sprocket 47 that is connected by a sprocket chain 48 to a sprocket 49 on shaft 50 of a reduction gear device 51, the latter being driven by a sprocket chain 52 connected to a reversible motor 53. The motor 53 and reduction gear device 51 are mounted upon a framework 54 carried by one of the end frames 10 of the mill. The carriage 20 is connected to sprocket chain 38 by means of a plate 55 that has its lower margin formed with a plurality of teeth, such as the tooth 56, Figure 5, which teeth extend through respective links of said sprocket chain and abut a retaining plate 57, both plates 55 and 57 being secured to the rear face of carriage 20.

The arrangement is such that the carriage 20 is propelled longitudinally of the guide-bars 18, 19 when the reversible motor 53 is driven. The direction of rotation of the motor 53 is controlled by respective reversing switches 59, 60 that are mounted upon the tops of brackets 16, 17, each of said switches being provided with an operating lever 61 extending toward the carriage 20. The latter is provided with adjustable oppositely projecting fingers 62, 62 adapted to engage the respective switch levers 61 to operate switches 59 or 60 whenever the carriage 20 approaches the respective ends of guide-bars 18, 19, thereby reversing motor 53 to cause the carriage to move in the opposite direction. Adjustable positive stops 63, 63 are mounted upon guide-bar 19 to prevent over-run of the carriage 20 in either direction.

The reciprocating movements of the carriage 20 along the guide-bars 18, 19, and the up and down movements of the slide 22 on said carriage occur in determinate timed relation to each other whereby the previously described movements of the scraper 36 with relation to the mill roll 12 are effected. To this end the rear end of the shaft 45 carries a sprocket 65 that is connected by a sprocket chain 66 with a sprocket 67 journaled upon a stub shaft 68 that is carried by a supporting bracket 69 mounted upon the top of end frame 10, behind bracket 17 thereon. The chain 66 may be provided with a tightener consisting of a sprocket 70 that rides thereon, said sprocket being adjustably journaled in a slot 71 formed in the end portion of an arm 72 that is mounted upon bracket 69. Mounted upon the face of sprocket 67 is a control cam 73 that controls the operation of the valve 30 hereinbefore described, said valve being mounted upon a part of bracket 69 as is most clearly shown in Figure 3.

The cam 73 is formed with cam-faces presently to be described, that are engaged by cam roller 75 that is journaled on the free end of an arm 76 that is pivotally mounted at 77 on bracket 69. The free end of arm 76 also is provided with a hand-knob 78 by which said arm may be manually moved, upon occasion, if required. The free end of the arm 76 also is provided with a stud 79 that is engaged in a lost-motion slot 80 formed in one end of a link 81, the other end of said link being connected to the free end of the operating lever 82 of the valve 30. A tension spring 83 is connected to lever 82 and to stud 79 in such a manner that the latter normally is urged toward the inner end of slot 80, which is to the left as viewed in Figure 3. When the lever 82 is fully moved to the left as viewed in Figure 3, fluid pressure passes from pipe 31 into pipe 29, thence to the lower end of cylinder 23 to raise the scraper 36. When the lever 82 is fully moved to the right, the fluid pressure passes into pipe 28, thence to the upper end of cylinder 23 to lower the scraper 36.

The various movements of the scraper 36 with relation to mill roll 12 are diagrammatically illustrated in Figure 6. The course shown in full lines and designated by characters $v$, $w$, $x$, $y$ and $z$ is a complete cycle of operation at one end of the roll, and the course shown in broken lines and designated $v'$ to $z'$ inclusive, is a complete cycle of operation at the other end of the roll, which brings the scraper back to the point of starting of the first cycle. The upwardly and downwardly moving phases of the scraper's movements, such as are indicated by lines $v$, $w$ and $y$, $z$ are necessarily oblique because the motor 53 is continuously moving the scraper longitudinally of the roll.

The details of cam 73 are best shown in Figure 3 wherein the respective arcuate cam surfaces are designated $a$ to $l$ inclusive. Cam surface $b$, $c$ is nearest the axis 68 of the cam and is concentric therewith. Cam surfaces $a$, $b$, and $c$, $d$ extend each way therefrom. Cam surfaces $e$, $h$, and $i$, $l$ are concentric with the axis 68, and are nearer said axis than points $a$ and $d$. Cam surfaces $f$, $g$ and $j$, $k$ are excentric with relation to axis 68. The operation of cam 73 in controlling valve 30 is most clearly illustrated in Figures 6 to 15 inclusive to which attention is drected.

A cycle of operation may be assumed to start at point $v$, Figure 6, the scraper 36, which is continuously reciprocated longitudinally of roll 12, by the motor 53, then being in the broken line position shown in Figure 7. The cam 73, rotating in the direction indicated by the arrow in Figure 10, moves the point $b$ under cam roller 75 whereby the lever 82 of valve 30 is moved to the point shown and fluid pressure passes through pipe 28 to the top of cylinder 23 and causes scraper 36 to descend into engagement with roll 12 at point $w$, Figures 6 and 7. Cam surface $b$, $c$ remains in engagement with cam roller 75, as shown in Figure 11, while the scraper 36 moves from point $w$ to point $x$, Figures 6 and 8, at which point switch 60 is operated to reverse the direction of longitudinal movement of carriage 20, and thereby to reverse the direction of rotation of cam 73, the position of said cam at the moment of reversal being shown in Figure 12.

The cam continues then to rotate in the direction indicated by the arrows in Figures 12 to 15 inclusive. Cam surface $b$, $c$ continues to hold cam roller 75 in the position shown in Figure 12, but cam surface $b$, $a$ permits spring 83 to pull stud 79 to the inner end of slot 80. Thereafter cam roller 75 does not follow cam surface $b$, $a$, but remains stationary until engaged by cam surface $k$, $j$, which moves it inwardly a little against the tension of spring 83. Passing off of surface $k$, $j$, the spring 75 pulls the cam roller outwardly so that it next is engaged by cam surface $g$, $h$, which forces the cam roller farther to the left, as is shown in Figure 13, and thus throws the valve lever 82 to the position that admits fluid pressure through pipe 29 to the lower end of cylinder 23, and vents fluid from the top thereof, thus causing scraper 36 to rise. The rising movement of the scraper starts when it is in position $y$ longitudinally of roll 12, and terminates at position $z$, as is most clearly shown in Figures 6 and 9. The scraper 36 remains in raised position from point $z$ to point $v'$, during which time cam surface $e$, $h$ passes cam roller 75, and the latter is engaged by cam surface $d$, $c$, as shown in Figure 14, which moves the cam roller inwardly of cam 73 until it reaches point $c$, as shown in Figure 15. This completes a cycle of operation of the scraper on one end of roll 12.

When the cam roller 75 is at point $c$, the valve 30 is operated to reverse the pressure in cylinder 23 and the scraper is again lowered to initiate a cycle of operation on the other end of roll 12, which cycle is identical with the cycle just described, and is indicated in Figure 6 by points $v'$ to $z'$ inclusive the scraper returning to the point of starting the first cycle. The cam reverses its direction of rotation at point $x'$, the same as at $x$, and the cam is so constructed and shaped that different cam surfaces control the movements of the scraper during the second cycle, although said movements are the same as during the first cycle.

Figure 3 shows one position of the cam and cam roller during the second cycle, the cam roller being moved outwardly (to the left), by cam surface $i$, $j$.

It will be seen that the scraper 36 always is fixedly positioned in a plane parallel to the axis of the roll 12, and operates against the roll in the same manner while moving in either direction longitudinally thereof. In each case the scraper, after forcing its way through the sheet of material 14 during its initial movement toward one end of the roll, reverses its direction and moves toward the opposite end of the roll, forcing its way through the sheet 14 and piling it up somewhat at its leading edge, as clearly shown in Figure 1, and laying the stripped material in convolutions or folds that are disposed obliquely of the roll. When the scraper rises, the fold of scraped material passes substantially lengthwise into the bite of rolls 11, 12 whereby intimate mixing of the ingredients thereof is effected.

The apparatus is fully automatic in its operation, requires the use of but a single scraper, and achieves the other advantages set out in the foregoing statement of objects.

Modification may be resorted to without departing from the spirit of the invention or the scope of the appended claims, which are not limited wholly to the specific construction shown and described.

What is claimed is:

1. In apparatus for treating plastic material, the combination of a pair of driven mill rolls, a scraper adapted to remove material from one of said rolls, means for continuously moving said scraper from one end of said roll to the other and back again, and a rotatable cam for controlling movement of the scraper into and out of engagement with said mill roll, said cam rotating in one direction when the scraper is moving toward one end of the roll and rotating in the opposite direction when the scraper moves toward the opposite end of the roll.

2. A combination as defined in claim 1 in which the cam is rotatably driven by the means that reciprocates the scraper longitudinally of the roll.

3. A combination as defined in claim 1 in which the cam is so constructed that a portion thereof is operative to control the movement of the scraper when the cam rotates in one direction, and a different portion thereof is operative when its rotation is reversed.

4. In apparatus of the character described, the combination of a pair of driven mill rolls, a scraper adapted to remove material from one of said rolls, a reversible motor for reciprocating said scraper longitudinally of said mill roll, and a rotatable cam reversibly driven by said motor for controlling movement of the scraper toward and away from said mill roll.

5. In apparatus of the character described, the combination of a pair of driven mill rolls, a scraper adapted to remove material from one of said rolls, a reversible motor for continuously reciprocating said scraper longitudinally of said mill roll, fluid pressure means for moving said scraper into and out of engagement with the mill roll, a valve controlling said fluid pressure means, and a continuously rotating reversible cam controlling the operation of said valve in timed relation to the longitudinal movement of the scraper.

6. A combination as defined in claim 5 in which the reversible cam is driven by the reversible motor.

7. In apparatus of the character described, the combination of a pair of driven mill rolls, a scraper adapted to remove material from one of said rolls, means for reciprocating said scraper longitudinally of said mill roll, fluid pressure means for moving the scraper toward and away from the mill roll, a control valve for said fluid pressure means, an operating lever for said valve carrying a cam roller, and a reversible rotary cam operating in timed relation to the longitudinal movement of the scraper engaging said cam roller, said cam roller following a different course on the cam when the latter rotates in different directions.

8. Cam mechanism for operating a valve or the like comprising an operating lever for said valve carrying a cam roller, and a reversible rotary cam engaging said cam roller, said cam roller following a different course on the cam when the latter rotates in different directions.

9. In apparatus of the character described, the combination of a pair of driven mill rolls, a scraper adapted to remove material from one of said rolls, means for reciprocating said scraper longitudinally of said mill roll, fluid pressure means for moving the scraper toward and away from the mill roll, a control valve for said fluid pressure means, an operating lever for said valve carrying a cam roller, and a reversible rotary cam engaging said cam roller, said cam roller following a different course on the cam when the latter rotates in different directions.

10. In combination, a mill comprising rolls for forming a sheet of material on one of the rolls thereof, a scraper for removing material from said mill roll, means for moving said scraper from one end of said roll to the other and back again, and a rotatable cam driven by said last-mentioned means for timing the moving of the scraper into and out of engagement with the mill roll.

RAYMOND W. ALLEN.